United States Patent [19]

Klug et al.

[11] B 4,006,263

[45] Feb. 1, 1977

[54] IRON-FORTIFIED SOLUBLE COFFEE AND METHOD FOR PREPARING SAME

[75] Inventors: Sigmund L. Klug, Monroe; Frederick J. Patrizio, New City; William J. Einstman, Port Chester, all of N.Y.

[73] Assignee: General Foods Corporation, White Plains, N.Y.

[22] Filed: Feb. 20, 1973

[21] Appl. No.: 333,838

[44] Published under the second Trial Voluntary Protest Program on March 23, 1976 as document No. B 333,838.

[52] U.S. Cl. .................................. 426/594; 426/74; 426/432; 426/495

[51] Int. Cl.$^2$ ............................................ A23F 1/04

[58] Field of Search ............ 426/74, 271, 218, 193, 426/365, 366, 311, 594, 595, 432, 495

[56] References Cited

UNITED STATES PATENTS

| | | | |
|---|---|---|---|
| 2,206,319 | 7/1940 | Geitz | 426/302 |
| 2,357,069 | 8/1944 | Barackman | 426/218 X |
| 3,243,347 | 3/1966 | Kracaver | 426/311 X |
| 3,432,308 | 3/1969 | Reimus et al. | 426/490 X |
| 3,595,351 | 8/1971 | Landenberg et al. | 426/271 X |
| 3,597,669 | 7/1971 | Strobel | 426/329 X |
| 3,689,641 | 9/1972 | Spangler et al. | 426/218 X |

OTHER PUBLICATIONS

*Coffee Processing Technology,* vol. 2, by Sivetz, published by Avi Pub. Co., Westport Conn., 1963, p. 19.
Abstract 70:86395n, 1969,–Phenolic Substances Contained in Coffee Wax.
Sivetz, "Coffee Processing Technology", vol. 2, p. 240, published by Avi Pub. Co., 1963.
Sivetz and Foote "Coffee Processing Technology", Published by Avi Pub. Co., pp. 232–233, Westport, Conn., 1963, vol. 1.

*Primary Examiner*—Frank W. Lutter
*Assistant Examiner*—Neil F. Greenblum
*Attorney, Agent, or Firm*—Thomas R. Savoie; Bruno P. Struzzi; Thomas V. Sullivan

[57] ABSTRACT

Liquid coffee extract having a solids concentration of from about 10 to 30% by weight is maintained at a temperature below about 70° F for a period of time sufficient to permit precipitation of materials which interact with elemental iron. The tempered extract is clarified, such as by centrifugation, fortified with nutritive ingredients including a soluble iron compound containing assimilable iron, and dried, such as by spray drying.

6 Claims, No Drawings

IRON-FORTIFIED SOLUBLE COFFEE AND METHOD FOR PREPARING SAME

BACKGROUND OF THE INVENTION

This invention is directed to the production of an iron-fortified soluble coffee product which is readily soluble in hot water without the formation of undesirable levels of sediment in the cup.

Liquid coffee is consumed by a large number of people and would constitute an excellent medium for improving the nutritional value of a diet which may otherwise be lacking the proper amounts of nutrients. It has been found however, that when iron fortified soluble coffee is dissolved in water a relatively large amount of sediment appears. It has been concluded that the presence of insolubles in the brew is at least in part due to the interaction of iron with polyhydroxyphenols and with polyhydroxyphenol-polysaccharide complexes that are present in coffee extract.

SUMMARY OF THE INVENTION

This invention provides a method for the removal of polyhydroxyphenols and polyhydroxyphenol-polysaccharide materials in coffee extract which react with elemental iron to form a precipitate, thereby resulting in increased cup sediment from an iron fortified soluble coffee product. It has been found that by tempering the coffee extract at below room temperature and then clarifying the tempered extract such as by centrifugation, iron reactive components can be removed from the extract. Iron addition, together with addition of other desired nutritive or fortifying ingredients may then proceed. The fortified extract may then be dried, such as by spray drying, freeze drying and the like to produce a soluble coffee containing iron at levels significantly exceeding the iron concentration naturally occurring in coffee, without adversely affecting the level of sediment occurring in the liquid beverages produced therefrom.

The tempering operation is a time-temperature dependent process, several hours being required to effect the desired insolubilization of the iron reactive materials at temperatures as high as 70°F, whereas, rapid (e.g. less than 1 minute) insolubilization occurs at temperatures of below about 40°F. Separation of the insolubles from the tempered extract may be accomplished in any of the manners (e.g. centrifugation, filtering, decanting, etc.) well-known to those skilled in the art.

Addition of a soluble iron compound to the tempered and clarified extract may, if desired, be accompanied by the addition of other nutritive ingredients such as vitamins, non-iron minerals, carbohydrates and protein. Obviously these other nutrients may be added at any point in the process, especially prior to drying. It may also be desirable to include in the product various natural and/or synthetic ingredients such as dyes and coloring agents, flavor and aroma agents and chelating agents which can modify and improve the appearance and/or flavor of the coffee product or beverage produced therefrom.

The fortified extract is dried to a soluble powder form, preferably by spray drying. Spray drying has been found to be the most preferred type of drying for the fortified, iron-containing coffee extract of this invention since spray drying provides a rapid and economical drying operation. Drying techniques which require a prolonged time should be avoided since problems may be encountered in maintaining a uniform solution of fortified extract.

DETAILED DESCRIPTION OF THE INVENTION

The coffee extract to be fortified in accordance with this invention can have any coffee solids concentration. Suitable extract can be obtained from commercial, countercurrent, semicontinuous, extraction processes, well-known to those skilled in the art, which produce extracts solids concentrations of from about 10 to 30% by weight or more. It will also be possible to fortify extracts which have been concentrated (e.g. evaporatively concentrated) say up to about 50% or more solids.

According to one embodiment of this invention hot coffee extract leaving the extractors is cooled to between about 35° and 70°F and maintained at this reduced temperature for a period of time sufficient to permit such iron reactive compounds as polyhydroxyphenols and polyhydroxyphenol-polysaccharide complexes to precipitate from the extract. It will be preferable, especially at temperatures above about 45°F to permit the extract to temper in an unagitated or static condition. Usually at a temperature above about 45°F a tempering period of 1 hour or more will be required. At extract temperatures of about 40°F or lower, precipitation of the iron reactive compounds proceeds rapidly enough that the tempering period may be reduced to less than about one minute; passage of the extract through a heat exchanger may be used to effect the desired precipitation.

The cold and/or tempered extract is then separated from the precipitate by such well-known means as centrifugation or filtration. This separation step may also be used to remove from the extract any sediment resulting from the extraction process.

The iron source is added to the clarified extract in an amount that is nutritionally desirable. For products meant for general consumption, the iron level should be sufficient to provide to the consumer with at least about 10% of the suggested daily intake of iron (Recommended Daily Allowance) for each cup of coffee. Care should be taken in choosing the source of iron such that the iron compound is soluble in the coffee extract, will not deteriorate during the spray drying operation, and will provide assimilable elemental iron to the consumer.

Iron sources which are suitable for use in this invention will be readily determined by those skilled in the art, selecting from such materials as: ferric albuminate, ammonium ferric citrate, ferric choline citrate, ferric citrate, ferric glycerophosphate, soluble ferric pyrophosphate, ferrous fumarate, ferrous gluconate, ferrous lactate, ferrous sulfate. Usually the iron source is added to the extract at a level of about 0.01 to 1.0 parts, typically about 0.1, of elemental iron per 100 parts soluble coffee solids.

Other nutritive ingredients may also be employed at nutritionally desirable levels in the iron fortified products of this invention, such as any one or more of carbohydrates, proteins, vitamins, non-iron minerals and preferably mixtures thereof. It would also be possible to incorporate various medicants such as enzymes, hormones and the like into the products of this invention. It is contemplated that the major amount of the nutritive ingredients added to the liquid coffee extract will be water soluble; however, it is also possible to include non-water soluble additives such as oil soluble vitamins by dissolving the oil soluble additive in an oil carrier and homogenizing this component into the liquid coffee extract. Alternatively, the oil-additive solution could be plated onto the dried coffee product.

The fortified coffee extract may be spray dried according to standard techniques well-known to those skilled in the coffee art. The resulting spray dried powder may be agglomerated in order to achieve a more pleasing product appearance by standard techniques such as those described in commonly-assigned U.S. Pat. Nos. 2,977,203, 3,544,760 and 3,615,670.

This invention is further illustrated but not limited by the following example.

EXAMPLE I

Commercial coffee extract (26% solids by weight) is chilled through a plate cooler to 55°F ± 5°F. The extract is held at this temperature for about 60 minutes in a static condition in order to permit precipitation of iron reactive compounds. The extract is drawn-off from the settled sludge and is passed through a Westfalia Centrifuge (Model No. SAMN 5036) in order to affect separation (back pressure — 60 psig., feed rate — 5 gal./min.). Iron, in the form of soluble ferric pyrophosphate ($Fe_4(P_2O_7)_3 \cdot 9 H_2O$ in 40% citric acid complex available from Mallinckrodt, Catalogue No. 5540) is added to the clarified extract at a level of 0.1% by weight elemental iron, and the extract is spray dried and then agglomerated.

The spray dried agglomerate of Example 1 was evaluated for cup sediment and was compared against a control spray dried agglomerate which was prepared as in Example 1 but with no tempering step prior to centrifugation. A quantitative analysis of the cup sediment (milligram of wet residual per cup) for standard strength cups of coffee resulted in a sediment level of 12 for the product of Example 1 and 62 for the control product.

Having thus described the invention what is claimed is:

1. A method for producing an iron-fortified soluble coffee comprising the steps of:
   a. producing a liquid coffee extract from a countercurrent, semi-continuous extraction process, said extract having a soluble coffee solids concentration of from about 10 to 30% by weight,
   b. cooling said extract as it is leaving the extraction process to between about 35° and 70°F,
   c. maintaining said extract at between 35 and 70°F for a period of time sufficient to effect precipitation of polyhydroxyphenols and polyhydroxyphenol-polysaccharide complexes that are present in the coffee extract, then
   d. separating said precipitated material from said extract,
   e. adding a source of assimilable, elemental iron to the separated extract of step d at a level of from 0.01 to 1.0% elemental iron by weight of soluble coffee solids, and then
   f. drying said iron-fortified extract.

2. The method of claim 1 wherein the liquid coffee extract is maintained between about 45° and 70°F for a period of at least 1 hour.

3. The method of claim 2 wherein the extract is kept in a static condition during tempering.

4. The method of claim 1 wherein the liquid coffee extract is cooled to 40°F or lower for less than 1 minute prior to clarification.

5. A method for producing an iron-fortified soluble coffee comprising the steps of:
   a. producing a liquid coffee extract from a countercurrent, semi-continuous extraction process, said extract having a solids concentration of from about 10 to 30% by weight,
   b. evaporatively concentrating the extract,
   c. cooling the extract to between about 35° and 70°F,
   d. maintaining the cooled extract at between 35° and 70°F for a period of time sufficient to effect precipitation of polyhydroxyphenols and polyhydroxyphenol-polysaccharide complexes that are present in the coffee extract, then
   e. separating said precipitated material from said extract,
   f. adding a source of assimilable elemental iron to the evaporatively concentrated extract which was separated in step (e), at a level of from 0.01 to 1.0% elemental iron, based on the weight of soluble coffee solids, and then
   g. spray drying the extract of step (f).

6. The method of claim 5 wherein the extract is maintained between about 45° and 70°F for a period of at least about 1 hour in order to effect precipitation.

* * * * *